No. 744,050. PATENTED NOV. 17, 1903.
F. M. COMSTOCK.
ROTARY ENGINE.
APPLICATION FILED MAR. 25, 1903.
NO MODEL.
Fig. 6
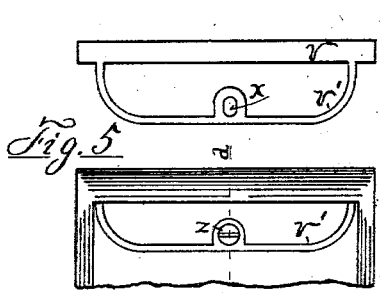
Fig. 5
Fig. 4
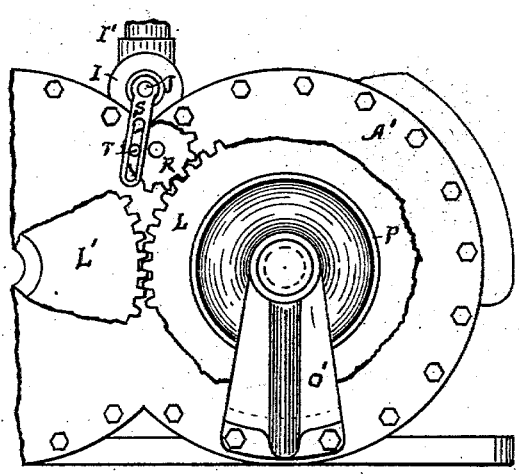
Fig. 3
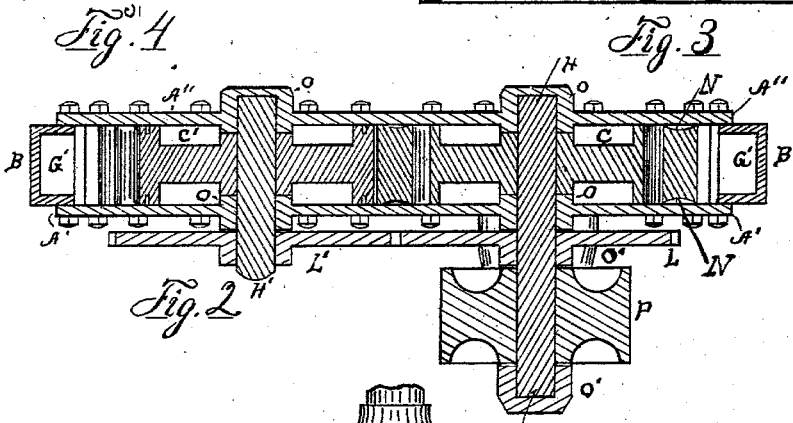
Fig. 2
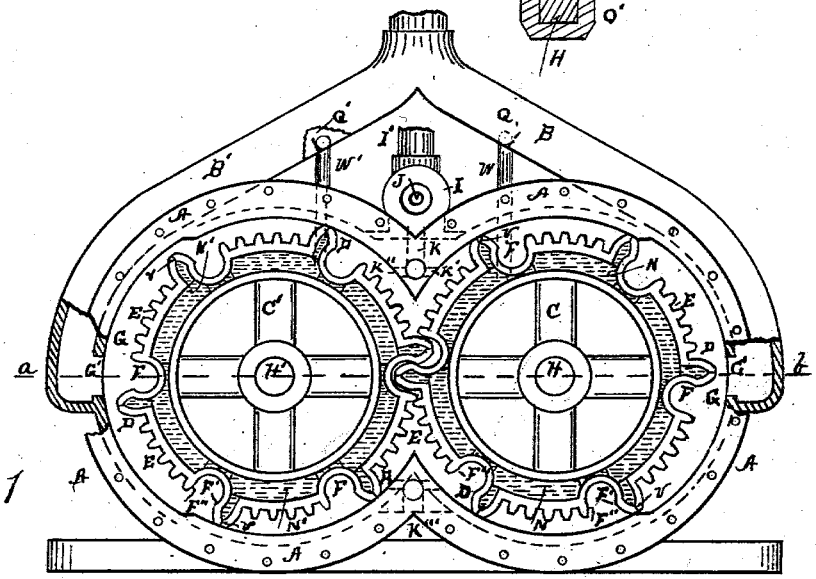
Fig. 1
Witnesses
H. E. Pritchett
Inventor
Francis M. Comstock No. 744,050. Patented November 17, 1903.

UNITED STATES PATENT OFFICE.

FRANCIS M. COMSTOCK, OF TOPEKA, KANSAS.

ROTARY ENGINE.

SPECIFICATION forming part of Letters Patent No. 744,050, dated November 17, 1903.

Application filed March 25, 1903. Serial No. 149,513. (No model.)

*To all whom it may concern:*

Be it known that I, FRANCIS M. COMSTOCK, a citizen of the United States, residing at Topeka, in the county of Shawnee and State of Kansas, have invented certain new and useful Improvements in Rotary Engines, of which the following is a specification.

The object of my invention is to produce a steam or other fluid motor that shall have a continuous rotation under pressure, using steam or other expanding fluid expansively, and also to secure for the sides of the rotating heads of such engine a packing that while practically steam-tight shall overcome the necessity for an arbitrary contact of said heads to the casing, thus overcoming one of the great drawbacks in rotary engines—to wit, excessive friction and consequent wearing of parts. These objects I accomplish by means of the devices illustrated in the accompanying drawings, in which—

Figure 1 is a side elevation with the casing removed, thus exposing the inner and rotating heads. Fig. 2 is a longitudinal section taken through the line $ab$ of Fig. 1. Fig. 3 is a detail illustrating the means of operating the valve. Fig. 4 is a detail of one of the drive-heads. Fig. 5 is a detail of the peripheral packing device used in the drive-heads; and Fig. 6 is a section of one of the drive-heads, taken through the line $cd$ of Fig. 4.

Similar letters of reference are used throughout the several views to indicate like parts.

The revolving heads C C' are inclosed in the case A by means of the face-plates A' A", which are securely attached to the said case A by cap-screws. The said heads C C' are properly attached to the shafts H H', which find suitable bearings in the face-plates and auxiliary shaft-bearing O, as shown. These various bearings may be of the simple nature illustrated or of phosphor-bronze set with a taper and having conformation suitable for taking up the wear, or the said bearings may be formed of antifrictional devices, as may be deemed best.

The rotating heads are formed with the chambers N N', which are filled with water and oil or any other suitable antifrictional substance that may be easily kept supplied. Preferably I use the oil and water, using the drawings of the exhaust-pipe to keep replaced any waste that may be made. To this end I form a trap Q Q' within the exhaust-pipes B B' and connect the said trap Q Q' with the chambers N N' by the pipes W W', thereby insuring a supply of oily water that should be equal to the waste. The chambers N may also be kept filled from any other desired source by means of the said pipes W W' or other equivalent. It will be seen that the chambers N N' extend up the sides of the drive-heads D, which are slightly concaved, or they may be slightly grooved or serrated for this purpose. The teeth E of the heads C C' are supposed to be too fine—eighteen, diametrical pitch—to require any especial conformation of their ends for the object in view, which is to form a steam-tight packing on the sides of the said heads C C'.

As will be understood, centrifugal force enters into this question and must be equalized by the number of revolutions of the drive-heads needed to secure the best results. This can be done in so far as may be practical by means of the automatic governing of the steam-inlet.

The drive-heads D of the revolving heads C C' are slotted and formed, as shown in Fig. 6, to receive the spring-packing V. (See Figs. 4, 5, and 6.) This packing may be set to place and adjusted by means of the screw Z and the slot X of the spring portion of the packing V, as shown. The drive-heads D sweep and pass in the female conformations F. The contact of the drive-heads D at their base with the outer edges of the female conformations F' F" is hardly more than that made by the contact of the fine teeth of the gears E.

The contact of the drive-heads D with the outer edges F' F" of the female conformations is but a trifle longer in time than that of the teeth E. After this time contact the heads drop away from contact and admit steam into the conformation F, a new contact having been made farther on in the rotation of the heads.

It will be understood that the object to be attained by the use of these inner teeth and the object of the contact of the heads with the outer edges of the female conformations is to secure a steam-tight joint, as the rotation of the driving-head C' to driven head C as to wear and force of contact is controlled by the outer and coarser toothed gears L L'.

As will be seen, G G represent an exhaust-chamber, and G' G'' are the outlets into the exhaust-pipes B.

The steam-inlet is at I' and the valve at I, the steam passing through the valve and into the inlet K and out at right angles with the said inlet through the inlets K' K'' and against the drive-heads D in apposition to the said inlets. There may be as many of the steam-inlets K, K', and K'' as needed by the depth of the face of the revolving heads C C'. As may be noted, it is my object to obtain a valued aid from the force of the entrance of the steam by directing it directly against the draw-heads D. To this end I control the valve, and thereby the steam velocity, by means of the lever S of the valve-stem J and the pin T of the rotating wheel R. This wheel is rotated by the outer gear-wheel L, as shown in Fig. 3. In the device shown the wheel R is set six to one and throws the valve wide open at a time when the drive-heads D have just passed the inlets K' K'', the valve at the opposite period of time being only partially open that the revolving heads to be driven in part by the expansion of the steam already admitted.

The engine may be reversed by the admittance of steam at the inlet K''', no regulating-valve being essential to a short use of the reverse motion.

The connection with the object or objects to be driven is herein shown to be a belt, the pulley P being indicated as the driver.

Having thus fully described my invention, what I claim as new, and desire to secure by Letters Patent, is—

1. A rotary engine embracing rotating intermeshing heads, chambers formed between the sides of said head and the engine-casing, and means for supplying the exhaust to said chambers.

2. A rotary engine having rotating heads therein, said heads and the engine-casing having chambers formed therebetween, said chambers adapted to receive the engine-exhaust, and a communication from said exhaust to said chambers.

3. The combination with the casing, of revolving heads therein, exhaust-pipes in communication with said casing, chambers arranged in said heads and casing, and pipes communicating with said chambers and first-named pipes.

4. The combination with the casing formed with inlet and outlet ports, of heads mounted therein, said heads being formed with chambers, and pipes interposed between the said chamber and exhaust-ports.

In testimony whereof I have signed my name to this specification in the presence of two subscribing witnesses.

FRANCIS M. COMSTOCK.

In presence of—
  W. S. McCLINTOCK,
  E. BAAB.